(12) United States Patent
Lee et al.

(10) Patent No.: US 7,404,234 B2
(45) Date of Patent: Jul. 29, 2008

(54) HINGE STRUCTURE FOR FLAT VISUAL DISPLAY DEVICE

(75) Inventors: Gang Hoon Lee, Gumi (KR); Jai Hyun Jo, Daegu (KR)

(73) Assignee: LG Electronics Inc., Seoul (KR)

( * ) Notice: Subject to any disclaimer, the term of this patent is extended or adjusted under 35 U.S.C. 154(b) by 393 days.

(21) Appl. No.: 10/502,088

(22) PCT Filed: Jul. 30, 2002

(86) PCT No.: PCT/KR02/01433

§ 371 (c)(1),
(2), (4) Date: Jul. 22, 2004

(87) PCT Pub. No.: WO03/067406

PCT Pub. Date: Aug. 14, 2003

(65) Prior Publication Data

US 2005/0125952 A1 Jun. 16, 2005

(30) Foreign Application Priority Data

Feb. 2, 2002 (KR) ................................ 2002-6047

(51) Int. Cl.
*E05D 11/10* (2006.01)
*E05D 11/08* (2006.01)
(52) U.S. Cl. ............................ 16/322; 16/337; 16/338; 16/342

(58) Field of Classification Search .................. 16/322, 16/303, 330, 337, 340, 374, 327, 342, 289, 16/290, 338; 248/575, 674, 454, 121, 371, 248/349.1; 455/575.3
See application file for complete search history.

(56) References Cited

U.S. PATENT DOCUMENTS 5,022,778 A * 6/1991 Lu .............................. 403/120

(Continued)

FOREIGN PATENT DOCUMENTS

JP 03176582 A * 7/1991

(Continued)

*Primary Examiner*—Robert J. Sandy
(74) *Attorney, Agent, or Firm*—Ked & Associates LLP

(57) ABSTRACT

A hinge structure for a flat visual display device comprising: a fixed plate; pivotal plates; a rotation shaft inserted into vertical planes of the fixed and pivotal plates; rotation shaft-fixing ends in both ends of the rotation shaft for allowing the pivotal plates fitted around the ends of the rotation shaft to rotate together with the rotation shaft; a braking unit securely settled in the fixed plate and having a braking member for surrounding the outer circumference of the rotation shaft to generate braking force in the rotation shaft; stoppers folded from the fixed plate; stopper guides each having a guide groove in the outer circumference into which each of the stoppers is inserted and for being fitted around each of the rotation shaft-fixing ends; and a leaf spring inserted into a tightening face between both ends of the braking member.

22 Claims, 6 Drawing Sheets

U.S. PATENT DOCUMENTS

| | | | |
|---|---|---|---|
| 5,079,799 A * | 1/1992 | Rude et al. | 16/342 |
| 5,092,017 A * | 3/1992 | Hatano et al. | 16/277 |
| 5,195,213 A * | 3/1993 | Ohgami et al. | 16/342 |
| 5,402,150 A * | 3/1995 | Stiles | 345/168 |
| 5,406,678 A * | 4/1995 | Kaden et al. | 16/342 |
| 5,467,504 A * | 11/1995 | Yang | 16/342 |
| 5,500,982 A * | 3/1996 | Hosoi | 16/297 |
| 5,542,152 A * | 8/1996 | Crompton et al. | 16/354 |
| 5,598,607 A * | 2/1997 | Katagiri | 16/337 |
| 5,682,645 A * | 11/1997 | Watabe et al. | 16/338 |
| 5,894,633 A * | 4/1999 | Kaneko | 16/306 |
| 6,085,388 A * | 7/2000 | Kaneko | 16/338 |
| 6,553,625 B2 * | 4/2003 | Lin et al. | 16/342 |
| 6,584,646 B2 * | 7/2003 | Fujita | 16/342 |
| 6,698,063 B2 * | 3/2004 | Kim et al. | 16/337 |
| 6,754,081 B2 * | 6/2004 | Rude et al. | 361/725 |
| 2001/0052167 A1 * | 12/2001 | Cho | 16/337 |

FOREIGN PATENT DOCUMENTS

| | | | |
|---|---|---|---|
| JP | 11085038 A | * | 3/1999 |
| JP | 11247840 A | * | 9/1999 |
| JP | 2000130461 A | * | 5/2000 |
| JP | 2000257324 A | * | 9/2000 |
| JP | 2001329735 A | * | 11/2001 |
| JP | 2002013522 A | * | 1/2002 |
| JP | 2003248527 A | * | 9/2003 |

* cited by examiner

HINGE STRUCTURE FOR FLAT VISUAL DISPLAY DEVICE

TECHNICAL FIELD

The present invention relates to a hinge structure, and more particularly, to a hinge structure applicable to a flat visual display device and functioning as a structure between two members adopting a hinge so as to provide both of the members with smooth movement and braking force owing to a suitable amount of frictional force.

BACKGROUND ART

As well known in the art, a number of hinge structures are applied to move a pivoting member vertically or laterally in respect to a fixed member about one rotation shaft. More specifically describing an operation of an article to which the hinge structure is applied by way of illustration, this operation may include certain operations such as opening/closing of an article cover, opening/closing of an upper portion of a notebook computer and vertical adjustment of a visual display device. In particular, the invention relates to a hinge structure which can be more suitably applied to a flat visual display device.

The above-mentioned flat visual display device may include various types of visual display devices such as an LCD monitor, a Plasma Display Panel (PDP) and Field Emission Display (FED).

In the meantime, examples of conventional hinge structures include those as proposed in Korean Laid-Open Utility Model Registration No. 20200110000941 and Korean Laid-Open Utility Model Registration No. 20200110000942. In particular, Korean Laid-Open Patent Application No. 1020000028262 discloses an example of hinge structure proposed for application to a visual display unit of an LCD.

However, the hinge structure as set forth above is so configured that the rotation shaft is fastened in its both ends with washers and nuts so as to support the both ends of the rotation shaft with independent forces. This causes different frictional forces to be applied to both sides of the rotation shaft thereby failing to apply the frictional force to the both sides as a balanced braking force so that pivotal members are not applied with laterally balanced force. Then, a user may not easily move the pivotal member as a drawback.

Further, in order to adjust external force applied in adjusting the vertical position of the flat visual display device, the user inconveniently adjust the external force in the both sides of the rotation shaft via complicated processes.

Further, in order to support the both sides of the rotation shaft, a number of washers or nuts are used thereby sophisticating a manufacturing process.

Moreover, when the rotation shaft is fastened to a supporting portion, the rotation shaft is fastened to only one point of the fixed plated for supporting the weight of the flat visual display device. This causes a problem that rolling takes place so that the flat visual display device moves laterally in respect to the supporting portion.

The present invention has been made to solve the above problems and it is therefore an object of the invention to provide a hinge structure for a flat visual display device in which frictional force applied to the hinge structure according to the weight of the flat visual display device can be readily adjusted.

It is another object of the invention to provide a hinge structure for a flat visual display device in which frictional force is concentrated into one region rather than both sides of a rotation shaft to apply the same force to the latter so that a user can readily adjust the position of the flat visual display device.

It is further another object of the invention to provide a hinge structure for a flat visual display device in which both ends of a rotation shaft are respectively supported to rotation shaft guides so as to prevent rolling of the flat visual display device.

DISCLOSURE OF THE INVENTION

According to an aspect of the invention to obtain the above objects, it is provided a hinge structure for a flat visual display device comprising: a fixed plate; pivotal plates; a rotation shaft inserted into vertical planes of the fixed and pivotal plates for allowing relative rotational movement; rotation shaft-fixing ends in both ends of the rotation shaft for allowing the pivotal plates fitted around the ends of the rotation shaft to rotate together with the rotation shaft; a braking unit securely settled in the fixed plate and having a braking member for surrounding the outer circumference of the rotation shaft to generate braking force in the rotation shaft; stoppers folded from the fixed plate; stopper guides each having a guide groove in the outer circumference into which each of the stoppers is inserted and for being fitted around each of the rotation shaft-fixing ends to restrict the pivoting angle of each of the pivotal plates; and a hinge-fixing unit having rotation shaft guides at both upper ends, the rotation shaft guides being placed in both ends of the rotation shaft for restricting shaking of the rotation shaft.

In the above hinge structure, the braking ability applied to the hinge structure according to the weight of the flat visual display device can be adjusted more conveniently. The position of the rotation shaft is more correctly guided during location of the flat visual display device so that the flat visual display device can be located more safely.

BEST MODE FOR CARRYING OUT THE INVENTION

Hereinafter the above-disclosed present invention will be described in reference to a detailed embodiment in conjunction with the accompanying drawings.

Figure 1:
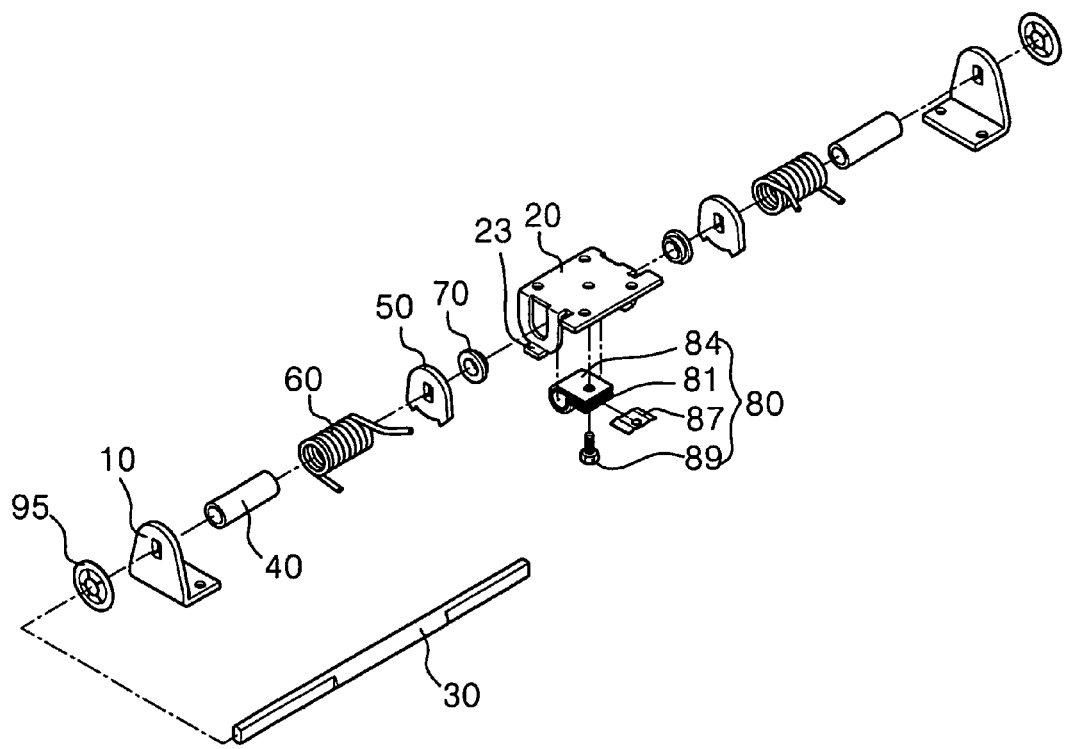
FIG. 1 is a perspective view of a hinge structure for a flat visual display device of the invention.

FIG. 1 is a perspective view of a hinge structure for a flat visual display device of the invention.

Describing the hinge structure of the invention as shown FIG. 1, the hinge structure has pivotal plates 10 for being mounted to a flat visual display device for vertically pivoting the same, a fixed plate 20 for being mounted to a supporting structure to which the flat visual display device will be supported for supporting the weight of the flat visual display device, a rotation shaft 30 inserted into vertical planes of the fixed and pivotal plates 20 and 10 facilitating vertical linear movement between the fixed and pivotal plates 20 and 10 with a certain degree of freedom, spacing members 40 fitted around the rotation shaft for maintaining gaps between the fixed plate 20 and the pivotal plates 10, elastic members 60 respectively provided around the spacing members 40 and with both ends supported by the fixed and pivotal plates 20 and 10 for generating a certain amount of elasticity to support the weight of the flat visual display device, stopper guides 50 respectively provided between the spacing members 60 and the fixed plates 20 for restricting the pivoting angle of the pivotal plates 20, sliding members 70 respectively provided in contact faces between the stopper guides 50 and the fixed plate 20 for reducing noise and abrasion, a braking unit 80 provided around a central region of the rotation shaft 30 and anti-release members 95 respectively provided around ends of the rotation shaft 30 and configured to hold the pivotal plates 10 in position.

In the meantime, all of the above components except for the braking unit 80, the rotation shaft 30 and the fixed plate 20 are symmetrically provided both sides of the pivotal axis so that the rotation shaft 30 can be pivoted as axially balanced.

The braking unit 80 includes a braking member 81 for forming a certain frictional face contacting around a central portion of the rotation shaft 30, a braking housing 84 provided around the braking member 81 for preventing the braking member 81 from fracture and imparting a certain strength to the braking member 81, a leaf spring 87 inserted between tightening faces of the braking member 81 for maintaining a certain gap therein to facilitate adjustment of braking force and a braking-adjustable member 89 vertically screwed into the braking member 81, the braking housing and the leaf spring 87 for adjusting the braking force owing to frictional force therebetween.

In particular, the braking member 81 is made of plastic, and preferably engineering plastic so that the braking force is smoothly generated from the frictional faces.

The operation of the inventive hinge structure will be briefly described in reference to the schematic construction of the invention as set forth above.

When a user desires to adjust the vertical position of a flat visual display device, the pivotal plates 10 mounted to the flat visual display device move in a vertical linear guiding direction. As the pivotal plates 10 vertically move, the rotation shaft 30 inserted into the pivotal plates 10 also moves identically. During rotation of the rotation shaft 30, frictional force takes place in the braking unit 80 contacting around the rotation shaft 30 in the substantially central portion thereof, and more particularly, in the braking member 81. The frictional force actuates as braking force for stopping the rotation shaft 30.

In addition to the braking force applied to the rotation shaft 30 by the braking unit 80, the sliding members 70 may generate a certain amount of frictional force to enhance braking ability.

In the meantime, stoppers 23 extended from both vertical planes in ends of the fixed plate 20 are inserted into the stopper guides 50 to pivot therein resultantly restricting a pivoting angle of the pivotal plates 10.

Restriction of the pivoting angle of the pivotal plates 10 also restricts the vertical rotation angle of the flat visual display device to which the pivotal plates 10 are mounted so that any fracture of the flat visual display device may be restricted.

Further, the weight of the flat visual display device is continuously applied along one direction, in particular, along the direction of gravity. The elastic members 60 are provided to support the weight and with both ends being respectively placed against the fixed and pivotal plates 20 and 10 for continuously applying a certain amount of restoring force to the pivotal plates 10.

The restoring force applied by the elastic members 60 corresponds to a certain amount of force sufficient to overcome the weight of the flat visual display device and the restoring force is linearly directed thereby causing no specific interference with an external force which is applied to vertically move the flat visual display device.

The restoring force from the elastic members 60 joined with the frictional force from the braking unit 80 supports the weight of the flat visual display device and assists a user to more readily operate the device.

Figure 2:
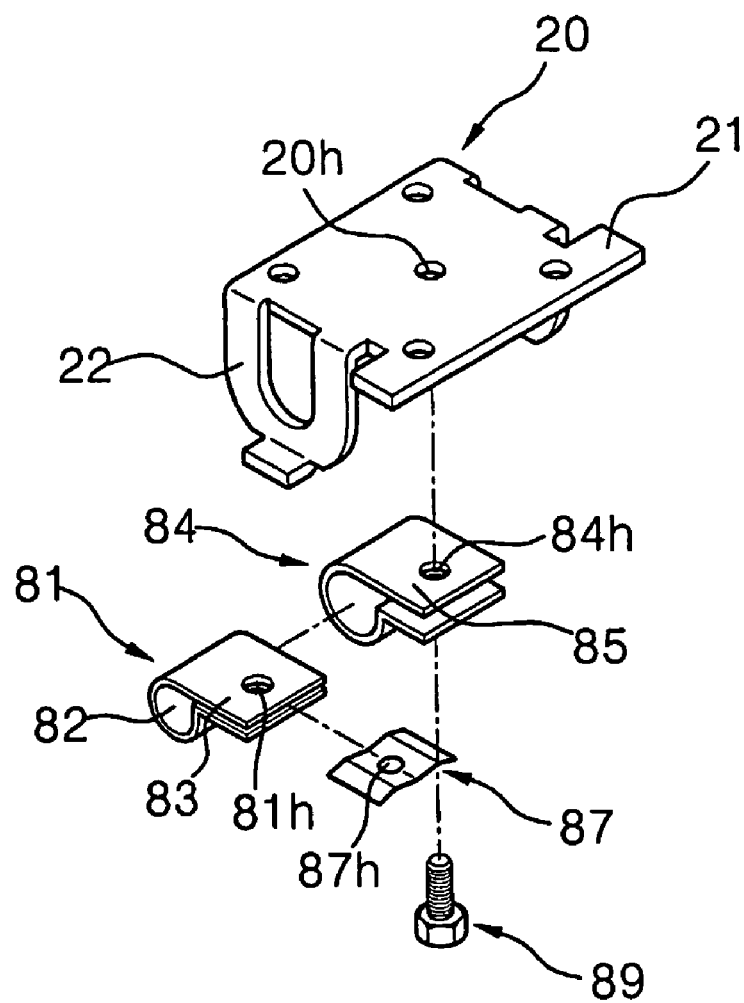
FIG. 2 an exploded perspective view of a braking unit in the hinge structure of the invention.

FIG. 2 an exploded perspective view of a braking unit in the hinge structure of the invention.

Describing more specifically the braking unit of the invention in reference to FIG. 2, it can be understood that the braking unit 80 is constituted of a plurality of sub-components.

First, the braking member 81 is provided with a frictional face 82 contacting around the central portion of the rotation shaft (refer to the reference numeral 30 in FIG. 1) and the second tightening holes 81*h*. The braking member 83 further includes tightening planes 83 for adjusting the entire braking force as the braking adjustable member 89 is screwed into the second tightening-holes 81*h* to adjust the amount of tightening.

The braking housing 84 is provided around the braking member 81 and made of high-strength material in order to prevent the braking member 81 from fracture. The braking housing 84 also has housing-tightening planes 85 equivalently configured with the tightening planes 83 for braking member and the first tightening holes 84*h* in the tightening planes 85 aligned with the second tightening holes 81*h*.

The leaf spring 87 is interposed between the tightening planes 83 for braking member to allow the tightening planes 83 to be supported with a certain gap.

The leaf spring 87 is provided with the third tightening hole 87*h* for locating the braking-adjustable member 89 as it is inserted into the third tightening hole 87*h*. The leaf spring 87 has an entire configuration constituted of a plurality of planes which are vertically folded. In particular, the leaf spring 87 maintains a certain amount of fastening force to the braking-adjustable member 89 owing to the restoring force of the spring, and provides a certain gap for allowing the tightening force from the braking-adjustable member 89 to be adjusted in a microscopic scale.

Further, the fixed plate 20 is provided with the fourth tightening hole 20*h* aligned with the first tightening holes 84*h*, the second tightening holes 81*h* and the third tightening holes 87*h* so that the braking-adjustable member 20 is fixedly inserted into the fourth tightening hole 20*h* for adjusting the braking ability of the rotation shaft 30 owing to the frictional face 82.

In the meantime, the fixed plate 20 is further provided with a fixed horizontal plane 21 with the fourth tightening hole 20h and fixed vertical planes 22 for insertionally receiving the rotation shaft 30.

Figure 3:
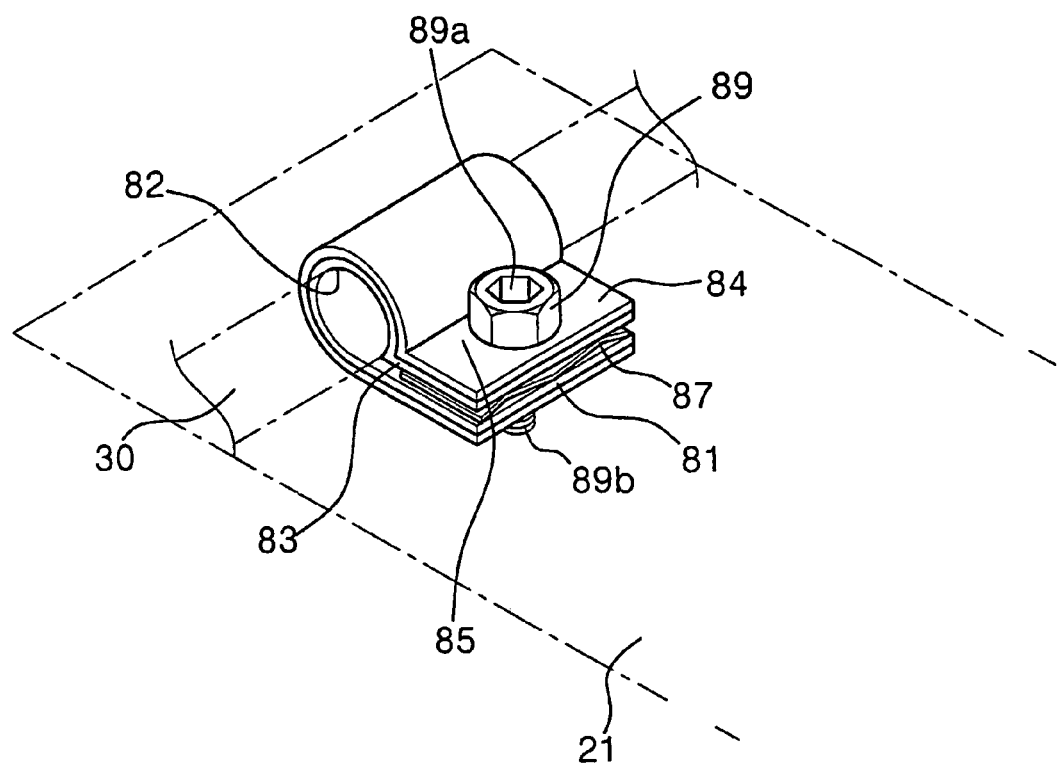
FIG. 3 is a perspective view of the braking unit in the hinge structure of the invention.

FIG. 3 is a perspective view of the braking unit in the hinge structure of the invention.

The operation of the braking unit in the inventive hinge structure will be described in reference to FIG. 3. The rotation shaft 30 is inserted through the frictional face 82 of the braking member 81 and the amount of tightening the frictional face 82 restricts or brakes the operation of the rotation shaft 30. In particular, the braking operation of the rotation shaft 30 is varied according to the degree of tightening the tightening planes 83 for braking member, that is the degree of tightening the braking-adjustable member 89.

In the meantime, for the purpose of more simply adjusting the degree of tightening the braking member 81, it is preferred that the braking-adjustable member 89 is provided in an upper portion with a wrench-receiving groove 89a for insertionally receiving a wrench and in a lower portion with a thread portion 89b. Further, the thread portion 89b are inserted in a position aligned with the first tightening holes (refer to the reference numeral 84h in FIG. 2), the second tightening holes (refer to the reference numeral 81h in FIG. 2), the third tightening holes (refer to the reference numeral 87h in FIG. 2) and the fourth tightening holes (refer to the reference numeral 20h in FIG. 2). The fourth tightening holes (refer to the reference numeral 20h in FIG. 2) contacting with the thread portion 89b is preferably provided with threads having a symmetric configuration with the thread portion 89b.

Preferably, the first to third tightening holes 84h, 81h and 87h are provided with a diameter slightly larger than that of the thread portion 89b so as to facilitate insertion of the braking-adjustable member 89.

As a result, in order to obtain fixed insertion, the braking-adjustable member 89 contacts by its upper portion with the upper face of the housing tightening planes 85 and by its thread portion 89h with the fourth tightening hole 20h so that other elements provided therebetween can be tightened. Moreover, the frictional face 82 is tightened as the tightening planes 83 for braking member in the braking member 81 is tightened. Tightening the frictional planes 82 increases the frictional force between the rotation shaft 30 and the frictional face 82 so that a hinge can readily stop its rotational movement.

If the braking-adjusting member is further strongly tightened, the braking force correspondingly increases and the movement of the pivotal plates 10 is braked under a stronger force.

Figure 4:
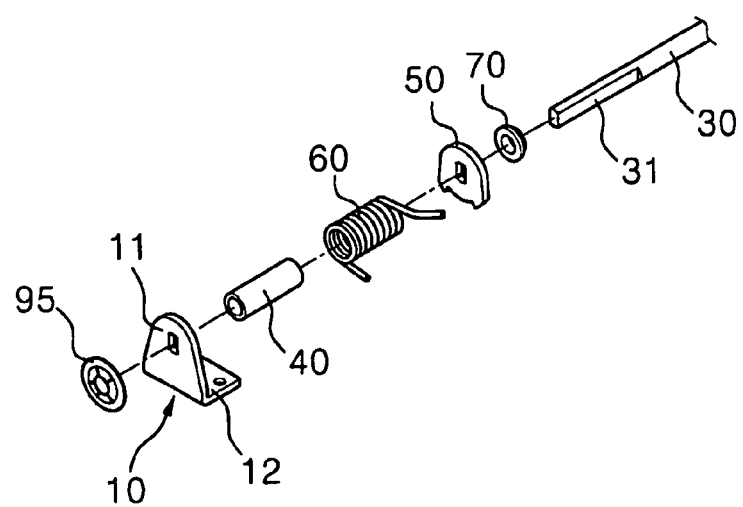
FIG. 4 is an exploded perspective view of a pivotal plate portion of the invention.

FIG. 4 is an exploded perspective view of a pivotal plate portion of the invention.

Referring to FIG. 4, in the hinge structure, the rotation shaft 30 is provided in both ends with rotation shaft-fixing ends 31 each formed by cutting symmetric portions in a circular section. The rotation shaft-fixing ends 31 are so configured to fit into receiving holes in some members such as the pivotal plates 10 and the stopper guides 50 thereby obtaining the same rotation angle to the pivotal plates 10 and the stopper guides 50.

However, the rotation shaft-fixing ends 31 are not restricted into the configuration as represented in the drawings but may have any configuration corresponding to that of the receiving holes as long as the receiving holes can be non-circularly shaped and rotate together with the rotations shaft 30.

The spacing members 40 have a circular internal configuration and thus move regardless of movement of the rotation shaft-fixing ends 31. However, though the inside configuration of the spacing members 40 is different from that of the rotation shaft-fixing ends 31, it shall not be intended that the rotation shaft-fixing ends 31 operated separate from the spacing members 40. The inside configuration of the spacing members 40 may be identical with that of the rotation shaft-fixing ends 31 so that the spacing members 40 and the rotation shaft-fixing ends 31 can move at the same pivoting angle.

Each of the elastic members 60 is provided around each of the spacing members 40 and with one end placed on the fixed horizontal plane (refer to the reference numeral 21 in FIG. 2) and the other end supported by a pivotal horizontal plane 12 so as to maintain position and elastic force thereof. When deformed from the original installation position under external force, the elastic members 60 generate restoring force to return the pivotal plates 10 into the original position.

Further, the pivotal plates 10 each includes the pivotal horizontal plane 12 and a pivotal vertical plane 11 folded from the horizontal plane 12 and having a hole for insertionally receiving the rotation shaft 30. The pivotal horizontal plane 12 has a plurality of holes by which the pivotal plate 10 is mounted to a flat visual display device.

The anti-release members 95 are each provided beyond the pivotal plate 10 so that the pivotal plate 10 which is fitted around the fixing end 31 does not slip off the fixing end 31.

Describing the configuration of the anti-release member 95 more specifically, a central portion of the anti-release member has a hole for insertionally receiving the rotation shaft-fixing end 31 and a plurality of folded faces radially formed around the hole. The folded faces are folded toward the tip of the rotation shaft-fixing end 31 so that the anti-release member 95 may not slip off the rotation shaft-fixing end 31. That is to say, when the rotation shaft 30 is inserted in a direction that the anti-release member 95 is fitted, the folded faces are adapted to suitably flex so as not to obstruct the anti-release member 95 from being fitted around the rotation shaft 30. However, the folded faces are caught by the rotation shaft 30 in a direction that the anti-release member 95 is detached so that the anti-release member 95 is not slipped off. This actuation also effectively prevents release of the previously installed pivotal plate 11.

Figure 5:
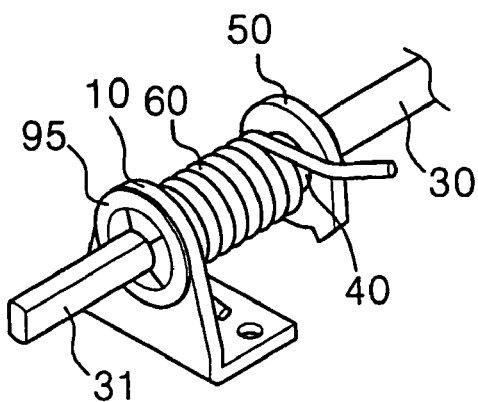
FIG. 5 is an assembled perspective view of the pivotal plate portion of the invention.

FIG. 5 is an assembled perspective view of the pivotal plate portion of the invention.

Referring to FIG. 5, the elastic member 60 is provided around the spacing member 40 as described above, the pivotal plate 10 is provided outside the elastic member 60, and the anti-release member 95 is further provided outside the pivotal plate for preventing release of the pivotal plate 10.

Figure 6:
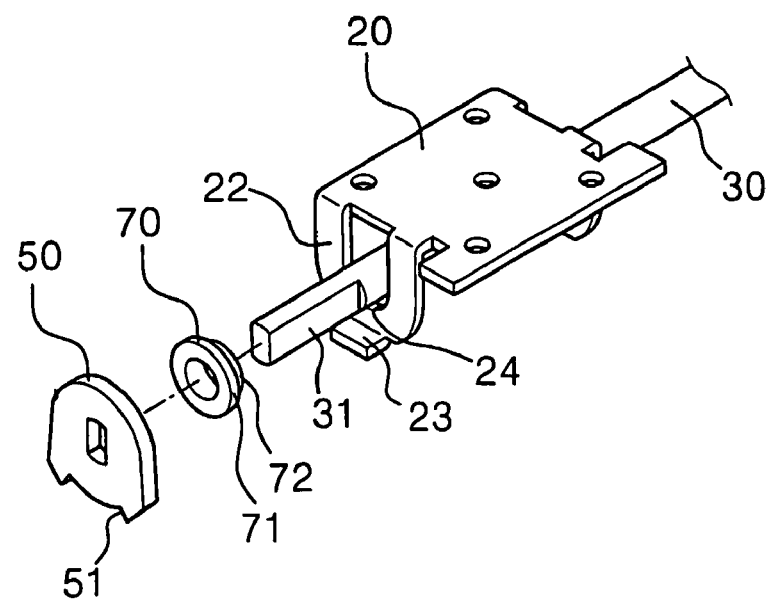
FIG. 6 is an exploded perspective view for illustrating a configuration for restricting the pivoting angle of a rotation shaft in the hinge structure of the invention.

FIG. 6 is an exploded perspective view for illustrating a configuration for restricting the pivoting angle of a rotation shaft in the hinge structure of the invention.

Referring to FIG. 6, it can be seen the fixed plate 20, the rotation shaft 30, the sliding member 70 and the stopper guide 50. Further, the fixed plate 20 includes the fixed vertical planes 22 with shaft-receiving holes 24 and the stoppers 23 outwardly folded from the lower ends of the fixed vertical planes 22. The stopper guide 50 is inwardly cut with a portion in the outer circumference to form a guide groove 51 in which the stopper 23 is settled so as to restrict the pivotal angle of the stopper guide 50 and the pivotal plate 10.

The sliding member 70 has a hole-sliding portion 72 in one region defined by reducing the diameter of the sliding member 70 with an outer circumferential portion contacting with the shaft-receiving hole 24 on the fixed vertical plane 22 and an inner circumferential portion contacting with the rotation shaft 30 and a spacing portion 71 for maintaining the fixed vertical plane 22 spaced for a certain distance from the stopper guide 50.

In particular, the rotation shaft 30 is provided in a substantially central region with a circular portion terminating at the shaft-receiving hole 24 and both portions (only one is shown) which further extend to form non-circular fixing ends 31 for receiving rotation shaft. The configuration is provided to restrict the pivotal angle of the pivotal plate 10 owing to the interaction between the stopper 23 and the stopper guide 50.

More particularly, the region of the rotation shaft 30 inserted into the fixed vertical plane 22 is circularly formed to enable relative rotational movement between the rotation shaft 30 and the fixed plate 20 while the non-circular fixing end 31 for rotation shaft is inserted into to the stopper guide 50 so that the stopper guide 50 necessarily rotates together with the rotation shaft 30.

By means of this configuration, the stopper guide 50 rotates together with the pivotal plate 10 and the rotation shaft 31 when the pivotal plate 10 is rotated, whereas the stopper 23 is fixed in position so as to restrict the pivoting angle of the pivotal plate 10 in respect to the fixed plate 20.

Figure 7:
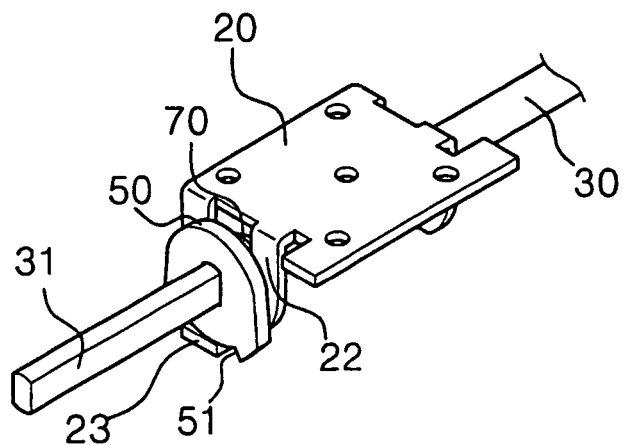
FIG. 7 is a perspective view for illustrating pivoting of a fixed plate in the hinge structure of the invention.

FIG. 7 is a perspective view for illustrating pivoting of a fixed plate in the hinge structure of the invention.

Referring to FIG. 7, when the pivotal plate 10 is rotated, the stopper guide 50 integral with the pivotal plate 10 is also rotated with the same rotation angle. However, rotation of the stopper guide 50 is restricted to the range represented in the drawings, in particular, to the width of the guide groove 51 owing to the catching operation of the stopper guide 23.

Figure 8:
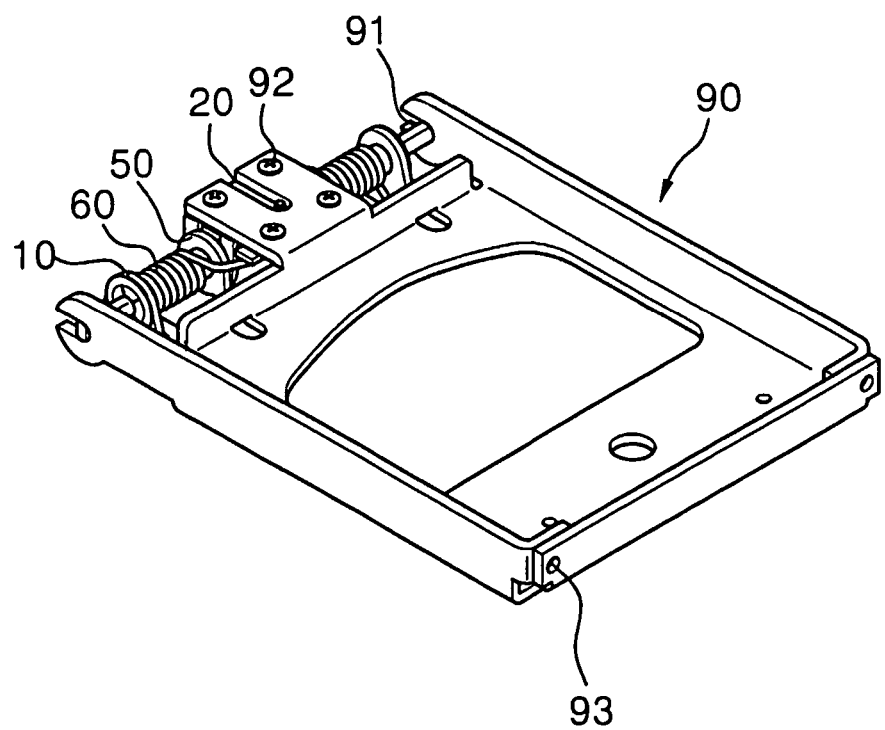
FIG. 8 illustrates a hinge-fixing unit in the hinge structure of the invention.

FIG. 8 illustrates a hinge-fixing unit in the hinge structure of the invention.

Referring to FIG. 8, the hinge-fixing unit 90 includes a number of hinge-fastening holes 92 for being aligned with fastening holes in the fixed plate 20, rotation shaft guides 91 respectively provided in both upper ends for guiding the both ends of the rotation shaft 30 and a number of base-fastening holes 93 in the lower end for fastening with a base structure.

The hinge fixing unit 90 is provided to obtain further smooth operation of the hinge structure, in which the both ends of the rotation shaft 30 are supportingly inserted into the rotation guides 91 so as to prevent any vertical shaking of the rotation shaft 30 in location of the flat visual display device. Further, the position of the flat visual display device can be stably adjusted.

Describing again, the hinge structure of the invention is fastened with the hinge-fixing unit 90 by inserting certain fastening members into the hinge-fastening holes 92. Further, the both ends of the rotation shaft 30 are inserted into the rotation guides 91 to guide the positions of the both ends of the rotation shaft 30 vertically and horizontally so that the vertical and horizontal positions of the flat visual display device can be adjusted more stably.

In the meantime, the number of base-fastening holes 93 in the lower end of the hinge-fixing unit 90 are fastened with the horizontal base structure. As fastened in a lower region with the base like this, the hinge-fixing unit 90 functions as a supporting portion by itself thereby eliminating the necessity for an additional supporting portion.

As an alternative embodiment, the hinge-fastening holes 92 can be omitted so that the fixed plate 20 is not fastened with the hinge-fixing unit 90. More particularly, another fixing unit can be attached by one side fastened to the fixed plate 20 and the other side fixed to the inner wall of an exterior housing so as to obtain the fixing operation.

As a result, the hinge-fixing unit 90 can be provided only with the rotation shaft guides 91 in the both upper ends by omitting the hinge-fastening holes 92 to guide the both ends of the rotation shaft 30 so as to prevent shaking of the rotation shaft 30.

It is represented a further another configuration of hinge-fixing unit for preventing shaking of the flat visual display device.

The hinge-fixing unit is integrally provided with the fixed plate 20 and downwardly connected with the fixed plate 20 while a lower portion of the hinge-fixing unit is fastened with a base.

The hinge-fixing unit functions as an integral supporting portion which downwardly extends as integral with the fixed plate 20 so as to more reliably restrict shaking of the rotation shaft 30 which may take plate owing to release of a screw in the hinge fastening holes 92. Further, this securely fixes the hinge structure to restrict rolling of the flat visual display device even though the rotation shaft guide 91 is omitted.

Figure 9:
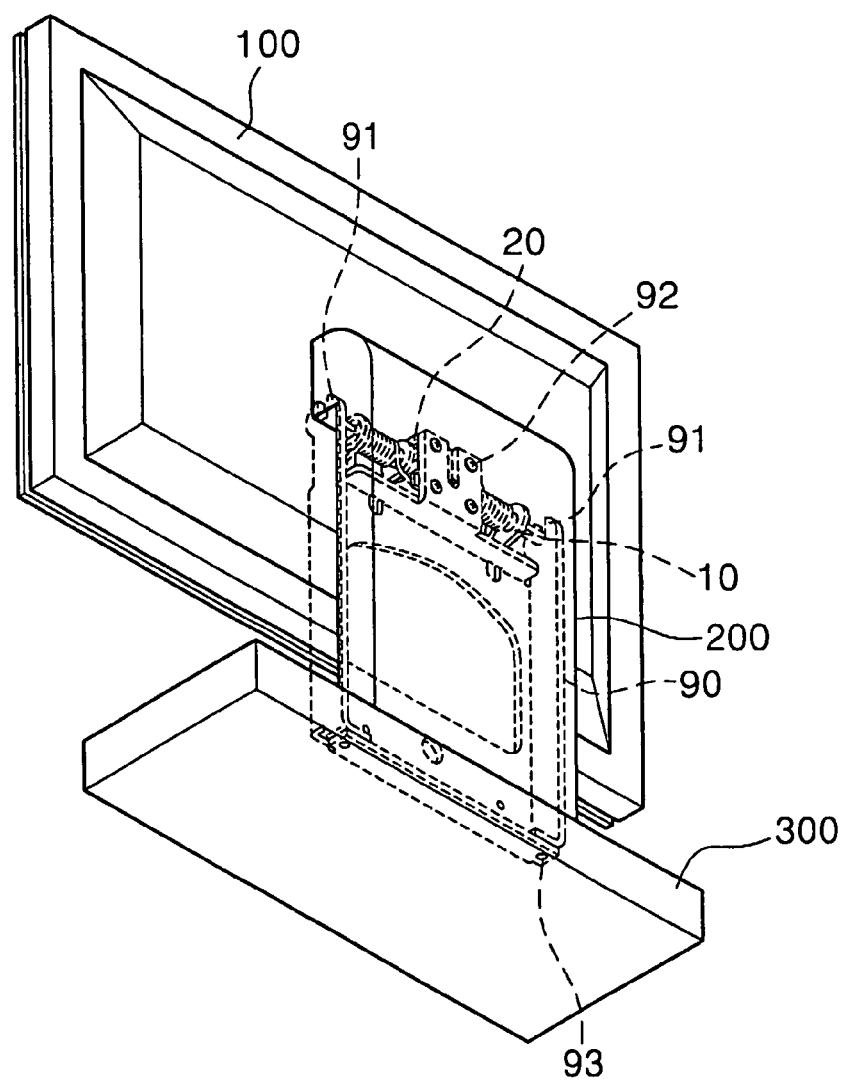
FIG. 9 is a perspective bottom view of the hinge structure of the invention which is fastened to a flat visual display device.

FIG. 9 is a perspective bottom view of the hinge structure of the invention which is fastened to a flat visual display device.

Referring to FIG. 9, in the hinge structure of the invention, the fixed plate 20 is fastened to the hinge-fixing unit 90 and the pivotal plates 10 are fastened to the rear plane of a flat visual display device 100 so that the flat visual display device 100 is vertically moved and adjusted in position by the hinge structure of the invention. Further, the hinge-fixing unit 90 also functions as the supporting portion, and an exterior housing 200 is provided around the hinge-fixing unit 90. Under the exterior housing 200, is provided a base 300 for maintaining the flat visual display device 100 in a stable erection state.

In the meantime, both ends of the rotation shaft 30 are respectively placed in the hinge shaft guides 91 in the upper both ends of the hinge-fixing unit 90 so as to restrict excessive vertical and lateral movement of the flat visual display device 100. The fastening members are inserted into the base-fastening holes 93 to directly fix the hinge-fixing unit 90 to the base 300.

In the meantime, as set forth above, instead of fastening the hinge-fixing unit 90 via the hinge-fastening holes 92 and the corresponding fastening members, the fixed plate 20 and the hinge-fixing unit 90 can be integrally provided to restrict rolling of the flat visual display device without the rotation shaft guide 91.

According to the above-mentioned configuration, the hinge structure of the invention can ensure stable operation of the flat visual display device.

The present invention is not restricted to the embodiment as set forth above but those skilled in the art will appreciate that other embodiments can be readily provided via addition, omission or modification of the components without departing from the spirit and scope of the invention.

INDUSTRIAL APPLICABILITY

As set forth above, the present invention provides in the outer circumference of the rotation shaft the braking unit which imparts the frictional force while allowing the braking force from the braking unit to be more conveniently adjusted so that the hinge structure can be used more conveniently as an effect.

Further, the braking unit for generating the braking force is provided as a single unit in a central region of the rotation shaft so that the braking force can be adjusted in single braking rather than individually adjusting the braking force applied to the both pivotal plates thereby ensuring stable operation to the both lateral portions of the hinge structure.

Further, in the hinge structure of the invention, the rotations shaft guides in the both upper ends of the hinge-fixing unit support the both ends of the rotation shaft so as to effectively prevent the rotation shaft from vertical or lateral shaking and thereby prevent the flat visual display device from lateral shaking. This allows the flat visual display device to be adjusted in position in an easy manner.

Moreover, the hinge-fixing unit is integrally provided with the fixed plate so that rolling of the flat visual display device can be restricted without separately providing the rotation guides.

The invention claimed is:

1. A hinge structure for a display device, comprising:
   a fixed plate having a main body portion configured to be mounted on a support and first and second arms that extend from the main body portion;
   a rotation shaft that passes through the first and second arms of the fixed plate;
   first and second pivotal plates configured to be attached to a display, wherein the first and second pivotal plates are fixed to first and second ends of the rotation shaft such that the pivotal plates rotate with the rotation shaft relative to the fixed plate; and
   a braking unit which is mounted on the fixed plate, wherein the braking unit is configured to apply a frictional force to the rotation shaft to limit rotation of the rotation shaft relative to the fixed plate, and wherein the braking unit comprises:
      a braking member that includes two tightening plates joined by a substantially cylindrical friction portion which surrounds an outer circumference of the rotation shaft and which is configured to apply friction to the rotation shaft to limit movement of the rotation shaft;
      a leaf spring interposed between the tightening plates; and
      a fastener configured to adjust a spacing between the tightening plates, to thereby vary an amount of friction applied to the rotation shaft by the braking member.

2. The hinge structure according to claim 1, further comprising at least one anti-release member respectively provided on each of the first and second ends of the rotation shaft for preventing release of the pivotal plates from the rotation shaft.

3. The hinge structure according to claim 1, further comprising a braking housing for surrounding an outer circumference of the braking member for restricting fracture of the braking member.

4. The hinge structure according to claim 1, wherein the leaf spring has a plurality of planes defined by folds.

5. The hinge structure according to claim 1, wherein said braking member is made of engineering plastic.

6. The hinge structure according to claim 1, wherein the first and second ends of the rotation shaft have flat portions which are configured to be inserted into slots in the respective pivotal plates so that the pivotal plates rotate with the rotation shaft.

7. The hinge structure according to claim 1, further comprising a pivoting restriction unit configured to limit pivotal movement of the pivotal plates relative to the fixed plate.

8. The hinge structure according to claim 7, wherein at least one of the first and second arms of the fixed plate includes a protrusion, wherein the pivoting restriction unit comprises at least one stopper guide which is mounted on the rotation shaft so that the stopper guide rotates with the rotation shaft, and wherein the stopper guide includes a guide groove which receives the protrusion such that the stopper guide and the attached rotation shaft can only rotate a predetermined amount relative to the fixed plate.

9. The hinge structure according to claim 8, further comprising at least one sliding member provided between the fixed plate and the at least one stopper guide for restricting noise and abrasion.

10. The hinge structure according to claim 9, wherein the sliding member comprises a washer mounted on the rotation shaft between the at least one stopper guide and the fixed plate, wherein the sliding member includes a sliding portion that abuts the at least one stopper member and a hole sliding portion that is inserted into a corresponding recess on the fixed plate.

11. The hinge structure according to claim 1, wherein the leaf spring allows the spacing between the tightening plates to be adjusted in minute amounts.

12. A hinge structure for a flat visual display device comprising:
   a braking member made of engineering plastic and provided on an outer circumference of a rotation shaft which is inserted into fixed and pivotal plates wherein said braking member comprises:
      a frictional face contacting with said rotation shaft for providing braking force, and
      braking-tightening planes extended from said frictional face and having contact faces into which a leaf spring and a braking-adjustable member are inserted for adjusting braking force;
   a braking housing around said braking member for maintaining the strength of said braking member; and
   at least one elastic member having a first end coupled to one of said pivotal plates and a second end coupled to said fixed plate, wherein said at least one elastic member is configured to generate a restoring force to offset the weight of the flat visual display device so as to adjust the flat visual display device with a slight amount of force, whereby the weight of the flat visual display device is supported and the movement thereof is compensated.

13. The hinge structure according to claim 12, wherein said braking member is provided in said fixed plate.

14. The hinge structure according to claim 12, further comprising a non-circular rotation shaft-fixing end in at least one portion of said rotation shaft for rotating said pivotal plates or said fixed plate together with said rotation shaft.

15. A hinge structure for a display device, comprising:
   a fixed plate having a main body portion and first and second arms that extend from the main body portion;
   a rotation shaft that passes through the first and second arms of the fixed plate;
   first and second pivotal plates configured to be attached to a display, wherein the first and second pivotal plates are fixed to first and second ends of the rotation shaft such that the pivotal plates rotate with the rotation shaft relative to the fixed plate; and
   a hinge-fixing unit having first and second rotation shaft guides which receive the first and second ends of the rotation shaft, wherein the hinge-fixing unit is configured to restrict shaking of the rotation shaft, and wherein the fixed plate is attached to and supported by the hinge-fixing unit.

16. The hinge structure according to claim 15, further comprising a pivoting restriction unit configured to limit rotation of the rotation shaft relative to the fixed plate.

17. The hinge structure according to claim 15, further comprising a braking unit which is mounted on the fixed plate and which surrounds the rotation shaft, wherein the braking unit is configured to apply a frictional force to the rotation shaft.

18. The hinge structure according to claim 17, wherein the braking unit comprises:
- a braking member that includes two tightening plates joined by a substantially cylindrical friction portion which surrounds an outer circumference of the rotation shaft and which is configured to apply friction to the rotation shaft to limit movement of the rotation shaft;
- a leaf spring interposed between the tightening plates; and
- a fastener configured to adjust a spacing between the tightening plates, to thereby vary an amount of friction applied to the rotation shaft by the braking member.

19. The hinge structure according to claim 15, further comprising at least one elastic member mounted on the rotation shaft that is configured to apply an elastic force that tends to return the first and second pivotal plates to a predetermined rotational position relative to the fixed plate.

20. The hinge structure of claim 19, wherein the at least one elastic member comprises a spring having a first end coupled to the fixed plate and a second end coupled to one of the first and second pivotal plates.

21. The hinge structure according to claim 19, further comprising at least one spacing member fitted around the rotation shaft, and positioned between the rotation shaft and the at least one elastic member for preventing noise and abrasion of the rotation shaft against the at least one elastic member.

22. The hinge structure according to claim 18, wherein said braking unit comprises a braking member made of engineering plastic.

* * * * *